United States Patent [19]

Ray

[11] 4,062,511
[45] * Dec. 13, 1977

[54] BRACKET

[75] Inventor: George F. Ray, Rockville, Md.

[73] Assignee: Liskey Architectural Mfg. Inc., Baltimore, Md.

[*] Notice: The portion of the term of this patent subsequent to Mar. 16, 1993, has been disclaimed.

[21] Appl. No.: 609,906

[22] Filed: Sept. 3, 1975

[51] Int. Cl.² .......................... A47F 5/08; A47F 5/16
[52] U.S. Cl. ...................................... 248/300; 52/584
[58] Field of Search ................. 248/300; 52/581, 584, 52/758 D, 753 J; 403/407

[56] References Cited

U.S. PATENT DOCUMENTS

| 3,267,631 | 8/1966 | Hammitt | 52/584 X |
| 3,363,381 | 1/1968 | Forrest | 52/584 X |
| 3,517,467 | 6/1970 | Propst et al. | 52/584 X |
| 3,827,209 | 8/1974 | Hobbs | 248/300 X |

FOREIGN PATENT DOCUMENTS 172,059   7/1960   Sweden .................. 52/584

Primary Examiner—J. Franklin Foss
Attorney, Agent, or Firm—Mason, Mason & Albright

[57] ABSTRACT

A bracket has a base or back that can be attached to a support, and spaced-apart, substantially vertical projections or flanges extend out from the back. The flanges are load-bearing and spaced apart to leave two side-by-side U-shaped recesses of unequal width. The recess of greater width is dimensioned to receive the two flanges that define the recess of lesser width when an identical and second bracket is positioned opposite the first and the flanges of the two brackets interfitted. Thus, a bracket pair is formed with their wide and narrow recesses being interfitted. At the bottom of the narrow recess, a captured nut on an apertured tab is positioned to receive a threaded screw or bolt from above. A strip with holes bridges the upper edges of the flanges of both brackets of the pair and screws can be passed through the holes between the flanges to engage the nuts at the lower ends of the narrow recesses.

8 Claims, 5 Drawing Figures

BRACKET

This invention, inter alia, relates to structures such as flooring consisting of removable panels, wall panels and panel assemblies of virtually any purpose where mechanical means of joining these panels is desirable. The brackets disclosed herein function as efficient load transferring devices and have unlimited application in joining members of structures for the purpose of maintaining alignment, for aesthetic appearance of the assembly or for simply positioning the parts with provision for adjustment in any direction in one plane, or for supporting substantial loads.

Specific applications include access flooring for use in computer rooms, general office spaces, shipboard electronics compartments, and in aircraft. In such cases panels are held in proper relation at any point along abutting edges where the device is used. The removable flooring provides access to cabling, ducting, etc. and the brackets of this invention allow greater load capacity, without the use of auxilliary supports along panel edges. By joining the brackets adjacent these edges, loads imposed upon one panel can be shared by neighboring panels and alignment of panel surfaces is ensured.

Application Ser. No. 476,543 filed June 5, 1974, describes a floor assembly of accessible panels wherein in one embodiment, each panel side is a support to which a bracket is attached. When the panels are assembled, neighboring panels are interconnected by interfitting the flanges of their adjacent brackets. Screws can then be passed through holes in an upper strip or bar and down between the flanges to engage nuts held on each bracket pair. Thus, each panel can be individually disconnected from the assembly by removing one of the two screws at each mating pair of brackets, leaving the upper bar affixed to the panel being removed. At the same time, the bar is flush with the panel's tread surface and the sides of the panels are tied together to share loads and resist deflection.

Figure 1:
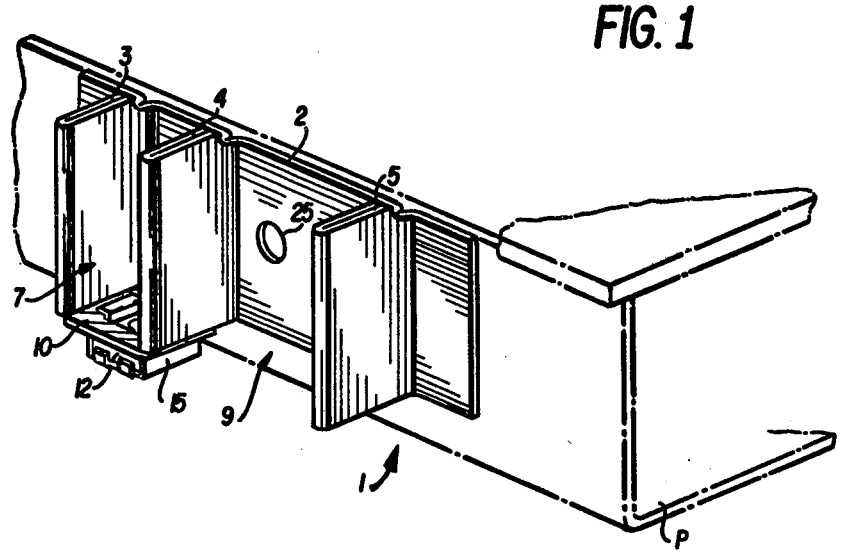
FIG. 1 is a perspective view of the front of a bracket affixed to the side of a panel.
Figure 2:
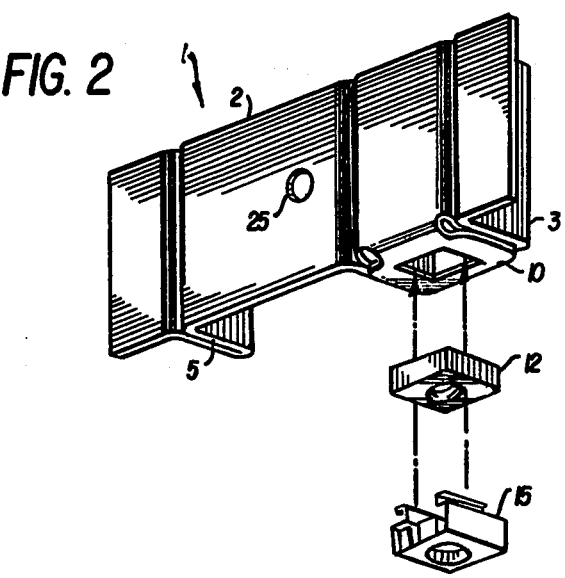
FIG. 2 is a perspective view of the bracket of FIG. 1.

In FIG. 1, the bracket 1 is seen with its back 2 welded or otherwise affixed to a support such as the side of a floor panel P, shown in phantom. In practice, each side of a square panel P can have a bracket 1 secured at the center of each of its sides so that an assembly of like panels can be fashioned. Alternatively, more than one bracket can be secured to each panel side at predetermined locations. In such an assembly, each panel is interchangeable and any of its sides can be placed in any position within the assembly as described in Ser. No. 476,543.

The bracket 1 has three flanges 3, 4 and 5 arranged in a row to define a relatively narrow recess 7 and a relatively wide recess 9. At the bottom of the narrow recess 7 an apertured tab 10 is formed and a nut 12 is held in a removable cage 15. One convenient way to make the bracket 1 is to die cut a piece of sheet steel and bend the strip to form doubled-over flanges 3, 4 and 5. Tab 10 can also be formed from a flat piece of strip steel and bent perpendicular to back 2 to form the bottom of recess 7.

Figure 3:
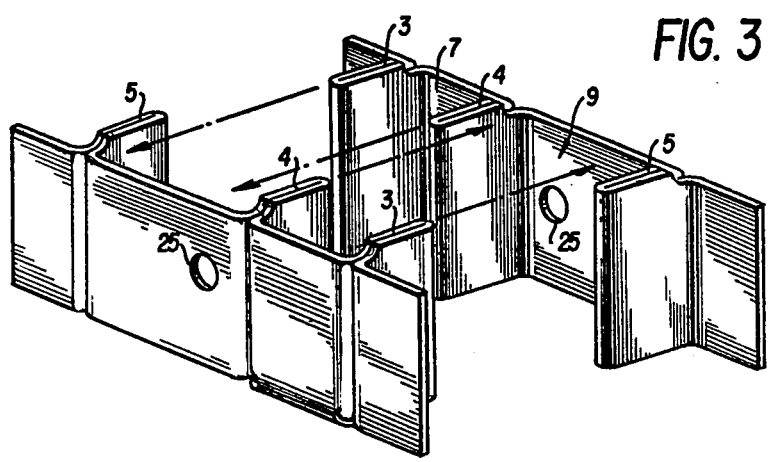
FIG. 3 is a perspective view of a pair of opposed brackets being interfitted.

It is preferred that the upper edges of each flange 3, 4 and 5 be raised as shown with respect to back 2. When two brackets 1 are positioned opposite one another so that their flanges face one another (FIG. 3), recesses 7 interfit within recesses 9 and flanges 3 and 4 of the brackets are received betweem flanges 4 amd 5.

Figure 4:
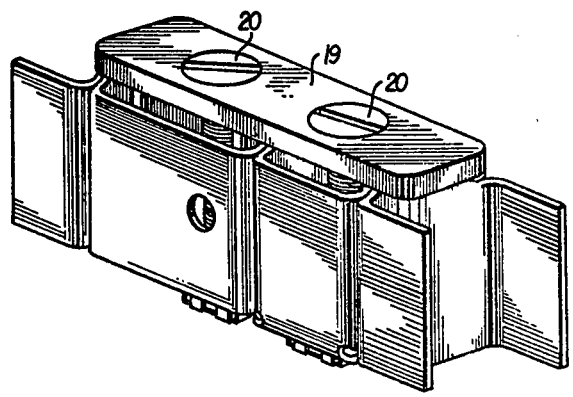
FIG. 4 is a perspecrive view of a pair of brackets bolted together.
Figure 5:
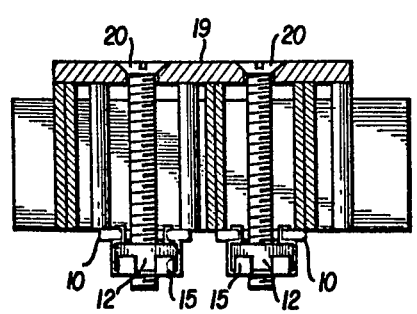
FIG. 5 is a section view of the pair of brackets of FIG. 4.

When interfitted as described above, the bracket pair will have a caged nut 12 in their recesses 7 located within recesses 9. A common apertured strip or bar 19 can then be placed to bridge the raised upper edges of flanges 3, 4 and 5 of each bracket 1 of the pair. Screws 20 are passed through the holes in bar 19 to engage each nut 12 and when tightened will hold the brackets together as shown in FIGS. 4 and 5.

It will be appreciated that the bracket 1 can have more than three flanges 3, 4 and 5 so long as two of the brackets form a pair in which the flanges of wider recesses receive the flanges of the narrow recesses. However, it is preferred to have only two recesses 7 and 9 as disclosed herein and to provide a screw or other fastener for each ot the interfitted narrow recesses 7. With the preferred arrangement, the bracket 1 will universally accept an identical oppositely positioned bracket.

Further, when secured to panel sides according to FIG. 1, a centrally located bracket 1 is accepted by another like bracket on a neighboring panel side and fastening the panel sides together is easily accomplished from above the interfitted brackets. The small clearance between the interfitted flanges 3, 4 and 5 as seen in FIG. 5 allows some play and screws 20 can be easily adjusted to engage nuts 12 during assembly. When the screws 20 are tightened, the tabs 10 are drawn up against the lower edges of flanges 3 and 4 and the bar 19 bears firmly down on the upper edges of all the flanges.

The backs 2 of the brackets 1 can be secured to a panel side or other support by welding or with conventional fasteners. For welding convenience a hole 25 is cut in the back 2 of each bracket. Alternatively, the brackets can be resistance welded to a mating panel side or other support or by projection welding via protrusions formed in either the bracket or the support.

While specific embodiments of the invention are illustrated and described, it is to be understood that the claims appended hereto are not limited to the disclosed structure but also encompass equivalents.

What is claimed is:

1. A bracket for attachment to a support comprising a metal strip having upper and lower edges, a back between those edges and at least three load bearing flange projections extending outwardly from said back, said projections being spaced apart from one another and at least two U-shaped recesses being formed between the projections, when said bracket is viewed in plan, said projections extending substantially vertically between said upper and lower edges, a first of said recess being greater in width than a second of said recesses and a middle projection being a side common to both of said recesses, said first recess being dimensioned to receive the second recess, together with the corresponding side projections, of an identical bracket when the projections of the two brackets are interfitted with one another to form a pair of opposing brackets.

2. The bracket of claim 1, wherein said back is substantially flat with means for attaching the bracket to a support.

3. The bracket of claim 1, wherein said bracket is formed from a single elongated strip of metal and said projections are folded over portions of said strip.

4. The brackets of claim 1, wherein said projections extend substantially perpendicular from said back.

5. The bracket of claim 1, wherein the top edges of said projections are positioned to receive a plate that bridges the recesses of both brackets and bears on said projections.

6. The bracket of claim 5, wherein the second and narrower recess has an apertured tab at the bottom thereof and a forward lip of said tab extends beyond said flanges.

7. The bracket of claim 6, wherein said tab is integral with the back of the bracket and a caged nut is fitted on the bottom of said tab.

8. The bracket of claim 7, wherein a threaded bolt is passed through a hole in said plate and extends down to engage the threads of said caged nut.

* * * * *